UNITED STATES PATENT OFFICE 2,668,853

PRODUCTION OF THIOPHOSGENE

Edward F. Orwoll, Medina, N. Y., assignor to Sharples Chemicals Inc., a corporation of Delaware No Drawing. Application October 12, 1950,
Serial No. 189,901

18 Claims. (Cl. 260—543)

This invention relates to a new process for the production of a very old compound, namely, thiophosgene. More specifically, it relates to a process which is outstandingly superior to the processes reported in the prior art for the preparation of said compound.

It is an object of the invention to provide a method by which the large-scale commercial production of thiophosgene becomes technically feasible for the first time. It is also an object to provide this compound, a highly useful and versatile intermediate, at a cost sufficiently low to encourage its widespread use in chemical synthesis. These and ancillary objects will become apparent from the following description.

According to the literature, thiophosgene was first prepared more than a century ago by Kolbe. In 1843 he published a paper in Liebig's Annalen, volume 45, page 44, in which he reported the preparation of this compound by conducting a mixture of carbon tetrachloride and hydrogen sulfide through a hot tube. Although Kolbe did not state the yield which he obtained, it is obvious from studying his paper that at best the yield was very low and that large quantities of by-products were obtained in the reaction.

In the intervening years, many other chemists have attempted to devise a satisfactory synthesis of thiophosgene. As a result of their efforts, many procedures have been reported, but without exception these procedures leave much to be desired. Some of them are scarcely worth consideration even for the preparation of thiophosgene on a mere laboratory scale. Others are utilizable for such small-scale preparation, but are of no value for large-scale preparation such as is required in commercial production.

Among the methods by which it has been reported that thiophosgene is formed along with other products are the following: (1) heating carbon tetrachloride with sulfur in a sealed tube; (2) heating carbon tetrachloride and ferrous sulfide in a sealed tube; (3) boiling a mixture of carbon tetrachloride, sulfur, and iodine; (4) chlorination of carbon disulfide at ordinary temperature; (5) electrolytic chlorination of carbon disulfide; (6) chlorination of methyl thiocyanate; (7) chlorination of bis(dichloromethyl) sulfide at ordinary temperature under irradiation from a mercury quartz lamp; (8) ultraviolet irradiation of perchloromethyl mercaptan, more properaly called trichloromethanesulfenyl chloride. These methods, although of academic interest, are valueless from a preparative standpoint, since the yields of thiophosgene which may be obtained through their use are quite low.

The general preparative method that has been most widely studied consists of reducing trichloromethanesulfenyl chloride with an inorganic reducing agent. Among the reducing agents which have been proposed for such use are tin and hydrochloric acid, stannous chloride, iron and hydrochloric acid, iron and acetic acid, copper powder, silver dust, and hydrogen sulfide.

The method employing tin and hydrochloric acid as reducing agent has had greater acceptance among chemists than the other methods. Dyson has made an extensive study of utilizing this reagent to reduce trichloromethanesulfenyl chloride to thiophosgene, and in Organic Syntheses, volume 6, pages 86–91, he gives detailed directions for carrying out the reaction under optimum conditions.

Even under these conditions, however, Dyson's method is subject to a number of objections. The method involves rapid addition of trichloromethanesulfenyl chloride to a hot mixture of tin and hydrochloric acid, resulting in a violent reaction which necessitates unusually great condensing capacity. The author states that the yield of thiophosgene is dependent upon the skill of the operator in conducting the reaction as rapidly as possible, yet in a manner which does not overtax the condensing system. The yield is also dependent upon a factor as capricious as the size of the tin particles. According to Dyson, yields of 50–60% are at times attained when the procedure is carried out by a highly skilled operator, but the average dependable yield is only 24%. The health hazards involved in the violent and unpredictable reaction are considerable, owing to the toxicity of both thiophosgene and trichloromethanesulfenyl chloride. Such hazards would no doubt be magnified if attempts were made to carry out the process on a commercial scale. Furthermore, on such scale the use of aqueous hydrochloric acid would require corrosion resistant equipment, and the use of tin, particularly in a suitable form, would be very expensive.

Up to the present time, the price of thiophosgene has been very high and the suppliers of this chemical have been few. The reason has resided in the lack of a satisfactory preparative method, and not in non-utility of the material in chemical synthesis. Indeed, an abundance of intriguing reactions of thiophosgene is recorded in the literature.

I have discovered a process which avoids the disadvantages of the processes known heretofore. My invention depends upon the discovery that trichloromethanesulfenyl chloride can be reduced to thiophosgene by means of aromatic compounds, such as benzene and derivatives thereof, containing per molecule at least three ring-attached hydrogen atoms which are capable of being replaced by chlorine. By a ring-attached hydrogen atom I mean a hydrogen atom which is directly attached to a carbon atom of the aromatic ring, as distinguished from a hydrogen atom not so attached. A molecule of any of the isomeric xylenes, for example, contains four hydrogen atoms which are ring-attached and are replaceable by chlorine, and contains six other hydrogen atoms which are not ring-attached. However, it should not be inferred that the presence of such non-ring-attached hydrogen atoms is deleterious in the practice of my invention. Indeed, xylene either in a relatively pure isomeric form or in the form of industrial xylol, may be employed with excellent results.

Trichloromethanesulfenyl chloride may be prepared by any means known to the art, or by modifications thereof. For example, satisfactory results may be had by chlorinating carbon disulfide in the presence of a small amount of iodine as catalyst, at ordinary temperature and for a period of time sufficient to complete the reaction. The crude product obtained therefrom may be purified by any suitable means, such as by distillation under reduced pressure.

Thus a typical preparation of trichloromethanesulfenyl chloride was conducted as follows. Iodine (3.5 g.) was dissolved in 700 g. of carbon disulfide, and about 1600 g. of chlorine in vapor phase was slowly introduced into this solution over the course of 24 hours. The reaction mixture was maintained between 15° C. and 20° C. The resulting crude material was distilled through an efficient fractionating column. There was thus obtained 1015 g. of trichloromethanesulfenyl chloride which boiled at 79–80° C. (90 mm.).

It is of course understood that in order to minimize undesirable side reactions in the practice of my invention, the aromatic compound used should preferably be one which is not decomposed to any appreciable extent under the reaction conditions employed, and that the principal reaction which it undergoes under said conditions is the desired reaction with trichloromethanesulfenyl chloride. In order that the reaction time need not be unduly prolonged, it is preferred that the aromatic compound be capable of reacting with said chloride at a reasonable rate. It is likewise preferred that the boiling point of the aromatic compound be sufficiently different from the boiling point of thiophosgene to permit ready separation of the latter as it is formed, such as, merely by fractional distillation from the reaction mass. It is desirable that said compound be liquid at the reaction temperatures and pressures employed, so that the reaction mixture is homogeneous or nearly so.

The invention is practiced to the very best economic advantage when the aromatic compound not only possesses the properties just mentioned, but in addition is cheap and is converted during the reaction to useful chlorinated substances which can be sold as by-products.

A wide variety of aromatic compounds may be advantageously employed in the practice of the invention. Among such compounds there may be mentioned aromatic hydrocarbons devoid of other than ring unsaturation, such as benzene and naphthalene, and derivatives thereof, such as chlorine, alkyl, and aryl derivatives thereof.

Thus there can be employed to advantage aromatic compounds having the formula: RQ, in which Q represents an aromatic hydrocarbon such as benzene and naphthalene, and in which R represents from 0 to 3 substituents on the aromatic ring, such as chlorine, alkyl, and aryl, radicals. Examples of R are chlorine, methyl, ethyl, propyl, butyl, amyl, hexyl, heptyl, octyl, nonyl, decyl, undecyl, dodecyl, phenyl, $\alpha$-naphthyl, and $\beta$-naphthyl. The foregoing examples of R include the various isomeric forms, such as of the various alkyl radicals specifically mentioned and containing more than 2 carbon atoms per radical. In the case of those radicals containing carbon atoms, it is preferred that the number of carbon atoms per radical does not exceed twelve, and more particularly that the totality of carbon atoms of all radicals does not exceed twelve. It is also preferred in the case of radicals having condensed aromatic rings not to exceed two condensed rings per radical. It is to be understood that when R represents more than one substituent, such substituents can be the same or different.

Specific examples of aromatic hydrocarbon derivatives are chlorobenzene, the various dichloro- and trichlorobenzenes, the various chloro, dichloro- and trichloronaphthalenes, the various mono-, di-, and trialkyl substituted benzenes and naphthalenes, including the various isomeric forms thereof, said alkyl groups containing from 1 to 12 carbon atoms, such as toluene, the various methyl, dimethyl, and trimethyl naphthalenes, ethyl benzene, the various propyl, butyl, amyl, hexyl, heptyl, octyl, nonyl, decyl, undecyl, and dodecyl benzenes, the various xylenes, cymenes, and other dialkyl benzenes, such as the various diamyl benzenes, methyl butyl benzenes, and the like, trialkyl benzenes, such as the various trimethyl benzenes, triethyl benzenes and the like, and various aryl substituted benzenes and naphthalenes, such as biphenyl, terphenyl, the isomeric phenyl naphthalenes and the like.

Benzene and mono- and dialkyl derivatives thereof, particularly such derivatives containing from 1 to 12 carbon atoms in each alkyl group, and particularly when the totality of carbon atoms in all such alkyl groups is not more than 12, meet the above outlined requirements particularly well. These substances therefore constitute preferred classes of aromatic compounds to be employed in my process. Among such substances the xylenes are outstandingly suitable, for example, mixed xylenes, such as industrial xylol. The term xylene as used hereinafter means any xylene, whether in relatively pure isomeric form or in mixed form, unless the particular form is mentioned specifically. Also the mono- and dihalogenated benzenes, such as chlorobenzene and the various dichlorobenzenes, are particularly useful in carrying out the invention.

My invention includes the discovery of suitable catalytic means for making the reaction between trichloromethanesulfenyl chloride and the aromatic compound proceed at a reasonable rate. Such catalysis may be accomplished very effectively by means of Friedel-Crafts catalysts, such as aluminum chloride, ferric chloride, zinc chloride, and stannic chloride. Of the catalysts mentioned specifically, the first two are somewhat preferred.

The catalyst may be introduced into the reaction mixture in any desired form, such as in the form of the catalyst per se. Alternatively, the catalyst may be formed in situ merely by adding to the mixture, a material which reacts with such small quantities of hydrogen chloride as may be formed during the early heating of the mixture, said catalyst being formed by said reaction. Examples of such materials are aluminum, iron, zinc, and tin. Finely divided forms of such materials are preferred, so that they will react rapidly with the hydrogen chloride.

The overall reaction between the aromatic compound and trichloromethanesulfenyl chloride may be represented thus:

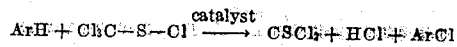

$$ArH + Cl_3C-S-Cl \xrightarrow{catalyst} CSCl_2 + HCl + ArCl$$

The symbol Ar is used in its usual sense to represent an aromatic radical, substituted or unsubstituted.

Although I do not wish to be bound by any particular theory of reaction mechanism, it is probable that the reaction proceeds in accordance with the following equation:

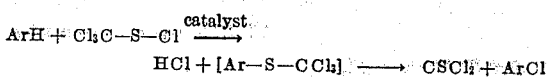

$$ArH + Cl_3C-S-Cl \xrightarrow{catalyst} HCl + [Ar-S-CCl_3] \longrightarrow CSCl_2 + ArCl$$

According to this theory, the aryl trichloromethyl sulfide shown in brackets is formed as an unstable intermediate which under the reaction conditions employed breaks down into thiophosgene and aryl chloride. I have reason to believe, based on experimental evidence, that the first reaction, involving the formation of the aryl trichloromethyl sulfide, proceeds at somewhat lower temperatures than does the second reaction which involves the decomposition of said sulfide as shown in the above equation. Whether this is true in all cases is, however, of no particular consequence, since I prefer to conduct the overall reaction according to a one-step procedure in which the temperatures employed are high enough to insure that said second reaction proceeds substantially to completion.

Although for the sake of simplicity the above illustrative equations show only one ring-attached hydrogen atom entering into reaction, it is understood that more than one such hydrogen atom may react in the same way. Thus further chlorination of the aromatic compound is within the purview of the invention.

The reduction of trichloromethanesulfenyl chloride to thiophosgene by means of aromatic compounds having ring-attached hydrogen substitutible by chlorine is the basis of this invention. As has been pointed out, the reaction may be catalyzed. Numerous procedural modifications may be practiced within the scope and spirit of the invention.

Trichloromethanesulfenyl chloride may be added to the aromatic compound, or the addition may be carried out in reverse order, or otherwise. The first-named mode of addition is somewhat preferred, and in such instances the reaction usually proceeds more smoothly when a considerable excess of aromatic compound, such as a severalfold excess, is present. In any event, it is preferable that said addition be sufficiently gradual to allow easy control of the release of heat of reaction, or in other words, control of the temperature of the reaction mass. Addition of catalyst may be to either reactant, or to the mixture of reactants, or otherwise.

While the one reactant is being added to the other, the reaction mixture is preferably maintained at a temperature high enough to permit the reaction to proceed, and to permit distillation of thiophosgene from said mixture. Following said addition, heating of the mixture preferably is continued for such period of time, say one or two hours or several hours, as is necessary to complete the reaction. It can be regarded that the reaction is substantially complete when little or no thiophosgene and hydrogen chloride are being distilled out of the reaction mixture.

Many of the aromatic compounds which I employ in practicing the invention differ one from another in their inherent respective reactivities toward trichloromethanesulfenyl chloride, particularly as modified by the use of catalysts. Therefore, a relatively narrow reaction temperature range applicable to all reaction systems cannot be given, and it is a matter of choice and judgment as to specific temperatures selected for specific reaction systems.

However, in general I have found that reaction temperatures varying from about 75° C. to about 250° C. can be employed to good advantage, and particularly temperatures varying from about 100° C. to about 225° C.

Temperatures much in excess of 250° C. are conducive to side reactions. At temperatures much below 75° C. the reaction rate is likely to be undesirably low, and thiophosgene, the boiling point of which is only slightly below 75° C. at atmospheric pressure, is removed only slowly from the reaction mass when the system is being operated under such temperature and pressure conditions. For good results, thiophosgene preferably is removed by distillation from the reaction mass soon after it is formed. Prolonged contact between thiophosgene and the aromatic compound frequently is preferably avoided, in view of the possibility of side reactions which may be promoted by the presence of Friedel-Crafts catalysts.

In the specific reaction system comprising trichloromethanesulfenyl chloride, xylene, and a Friedel-Crafts catalyst such as ferric chloride or aluminum chloride, for example, temperatures varying from about 110° C. to about 175° C. are highly satisfactory.

The particular pressure employed is not critical, and thus my process may be carried out at atmospheric, subatmospheric, or superatmospheric pressure. In general, atmospheric pressure is quite satisfactory. However, at times it may be expedient to employ subatmospheric pressure to facilitate removal of thiophosgene from the reaction mass. On the other hand, superatmospheric pressure may sometimes be desirable as an aid in controlling the reaction temperature.

The process may be carried out batchwise, continuously, semi-continuously, or otherwise, as desired. A procedure which has given excellent results simulates continuous operation in part by virtue of the fact that one of the reactants (trichloromethanesulfenyl chloride or the aromatic compound) is gradually added to the reaction zone concurrently with removal of thiophosgene.

At times completely continuous operation may be desired, in that by such operation it is relatively easy to maintain a supply of new and active catalyst, thus causing a rapid reaction rate; the composition of the reaction mass can be controlled readily; and the contact time of the reactants in the reaction zone can be regulated closely.

It is also contemplated within the scope of the invention that it may at times be advantageous to conduct the process in two steps, namely: (1) reaction of trichloromethanesulfenyl chloride with the aromatic compound in the presence of catalyst at relatively low temperatures to form preponderantly the intermediate aryl trichloromethyl sulfide; and (2) decomposition of said intermediate to thiophosgene and aryl chloride in a hotter zone maintained at relatively higher temperatures.

The reactants may be brought together with either or both in liquid phase or vapor phase, both in liquid phase being preferred. For reaction in vapor phase, such as in a closed system, the catalyst preferably is one which can vaporize readily at the reaction temperatures employed, such as stannic chloride.

In a preferred practice of the invention, trichloromethanesulfenyl chloride is gradually added by any convenient means to the aromatic compound (the latter premixed with a catalyst) contained in a suitable reaction vessel, which is provided with means for stirring and fractionating and to which there are attached means for condensing thiophosgene and, if desired, means for absorbing hydrogen chloride. It is well to pre-heat the aromatic compound before initial addition of trichloromethanesulfenyl chloride thereto, so that the reaction can set in promptly. It is also well for the aromatic compound to be present in considerably more than stoichiometric amount, the excess serving as a solvent or diluent, thus providing as homogeneous a reaction mixture as possible. Temperature conditions chosen for the reaction are largely dictated by the particular aromatic compound being employed, so that the reaction will proceed at a reasonable rate.

Hydrogen chloride is evolved soon after the initial addition of trichloromethanesulfenyl chloride to the reaction vessel. Soon thereafter, sufficient thiophosgene is formed to allow its removal by fractionation from the reaction mass along with the hydrogen chloride formed. Concurrently, further quantities of the organic chloride are added to said mass. The thiophosgene and hydrogen chloride thus removed are passed through a condenser in which the thiophosgene is fractionally condensed out of the mixture and collected in a suitable receiver. The hydrogen chloride is then recovered by suitable means such as a water scrubber.

The rate at which product thiophosgene is removed is regulated to maintain an overhead vapor temperature of about 70–80° C. by virtue of refluxing unremoved thiophosgene. If this temperature range is exceeded, the column is placed on total reflux until the temperature falls to the desired level. The manipulation found necessary to maintain the desired overhead vapor temperature is dependent upon several factors, such as, the rate at which thiophosgene is being formed, and the boiling point of the particular aromatic compound being employed.

After all the trichloromethanesulfenyl chloride has been added, heating of the reaction mixture and removal of product thiophosgene are continued until it is noted that very little product thiophosgene and hydrogen chloride are being recovered. A small amount of thiophosgene is likely to be entrained by the stream of hydrogen chloride, particularly when said stream is vigorous. In order to recover such entrained thiophosgene, it is well to conduct the stream of hydrogen chloride through a trap, said trap being maintained at low temperature, such as between 0° C. and −40° C. This portion of the desired product may be combined with the main distillate, the entire lot being refractionated if it is desired to obtain the thiophosgene in a pure state.

The residue remaining in the reaction vessel after the full recovery of thiophosgene, is fractionally distilled to recover excess aromatic compound and its chlorination product formed during the reaction. Before distillation, water may be used for deactivation of catalyst. The recovered aromatic compound may be used for any suitable purpose, such as for reaction with further trichloromethanesulfenyl chloride. Likewise, its chlorination product may be used for any suitable purposes. A further valuable by-product may be obtained by passing the stream of hydrogen chloride through a water scrubber placed behind the cold trap.

It will be understood that the above particular description with respect to my preferred method of practicing the invention is by way of illustration and not of limitation, and that many variations are possible and will suggest themselves to persons skilled in the art upon becoming familiar herewith.

Likewise the following examples are given by way of illustration and not of limitation.

Example 1

Anhydrous industrial xylol (1100 cc.) was placed in a 3-neck flask which was fitted with an adding funnel, a mechanical stirrer, and a packed fractionating column fitted with a reflux dephlegmator. The lower end of the dephlegmator was connected to a product offtake fitted with a stopcock, and leading to a water-cooled condenser. The condenser was fitted to a receiver. The upper end of the dephlegmator, through which the hydrogen chloride stream was removed, was connected to a cold trap immersed in ice and thence to a water scrubber.

Ferric chloride (3 g.) was added to the flask, and the resulting mixture was stirred and heated to 120° C. Trichloromethanesulfenyl chloride (186 g., 1 mole) was gradually added through the funnel over a 2 hour period. Strong evolution of hydrogen chloride commenced about 20 minutes after the first portion of trichloromethanesulfenyl chloride was introduced. A small amount of thiophosgene appeared in the receiver. The temperature of the reaction mixture was raised to 140° C., and addition of a second mole of trichloromethanesulfenyl chloride was started. Within 20 minutes, a copious reflux of thiophosgene was obtained at an overhead column temperature of 70° C. This permitted a slow removal of thiophosgene. Addition of the second mole of trichloromethanesulfenyl chloride was completed in 100 minutes, and a third mole was added during 1.5 hours. The volume of overhead vapor diminished about 35 minutes after addition of the third mole was completed. Intermittent product take-off was then imposed, the overhead column vapor temperature being maintained between 67° C. and 75° C. Intermittent product take-off was continued up to 80° C. overhead column vapor temperature. The thiophosgene collected in the receiver weighed 194 g.

The residue in the flask was allowed to stand overnight, and it was then again heated to reflux for 2.5 hours, after which very little hydrogen chloride was evolved. During this time, an additional 29 g. portion of thiophosgene was collected at 73–80° C. overhead column vapor temperature. This was added to the main portion, giving a total of 223 g. of crude product, or a yield of 64.6%.

Example 2

This example is a modification of Example 1.

The temperature of the cold trap was maintained in the neighborhood of −40° C. by means of cooling with Dry Ice. Anhydrous industrial xylol was refluxed in the apparatus in order to dehydrate the latter. When dehydration was complete, the overhead temperature was 132° C. The xylol remaining in the flask, which amounted to about 1200 cc., was treated with 4 g. of ferric chloride. This mixture was stirred and heated to 140° C. before trichloromethanesulfenyl chloride was added thereto. Three moles of this chloride were added during 5 hours, the reaction mass being maintained between 140° C. and 150° C. during this period. Very soon after the addition was started evolution of hydrogen chloride set in, and within 35 minutes a copious reflux of thiophosgene was obtained. Throughout the addition, product thiophosgene was taken off at overhead column vapor temperatures between 66° C. and 74° C.

The volume of overhead vapor diminished about an hour after addition of trichloromethanesulfenyl chloride was completed, and heating was then discontinued. The combined products from the receiver and the cold trap weighed 230 g. This material had a specific gravity of 1.500 at 15° C., compared to a literature value of 1.508 at 15° C.

The residue in the flask was allowed to stand overnight, and it was then heated to reflux for the purpose of stripping out any remaining thiophosgene. Refluxing was continued for 2.5 hours with intermittent take-off of thiophosgene at 70–80° C. top column temperature. The distillation was discontinued when the final 0.5 hour of refluxing did not reduce said overhead temperature below 80° C. An additional 53 g. of thiophosgene was thus obtained. Thus the total amount obtained in the experiment was 283 g., a yield of 82%.

The residue remaining in the flask after removal of thiophosgene was combined with a portion of the residue from the experiment of Example 1. This combined residue was treated with water to deactivate the catalyst, and was then distilled under reduced pressure through a packed column. Three fractions were taken as follows:

*Fraction 1.*—B. P. 70–85° C./80 mm. 1119 g. Sp. gr. 0.864/29° C. Recovered xylol.

*Fraction 2.*—B. P. 85° C./80 mm.–99° C./50 mm. 70 g. Intermediate cut.

*Fraction 3.*—B. P. 99° C./50 mm. until the overhead stopped. 192 g. Sp. gr. 1.060/27° C. Light yellow. Essentially chloroxylene.

Example 3

By the procedure employed in Example 2, chlorobenzene is reacted with trichloromethanesulfenyl chloride under temperature conditions between approximately 125° C. and 135° C. to obtain thiophosgene in good yield.

Example 4

By the procedure employed in Example 2, toluene is reacted with trichloromethanesulfenyl chloride under temperature conditions between approximately 105° C. and 115 C. to obtain thiophosgene in good yield.

Example 5

By the procedure employed in Example 2, benzene is reacted with trichloromethanesulfenyl chloride, the temperature of the reaction mass being maintained between approximately 75° C. and 85° C. during the reaction. In order to speed up the reaction, the use of a closed system in which temperature conditions of from about 115° C. to about 120° C. are maintained is recommended to obtain thiophosgene in good yield.

Example 6

By the procedure employed in Example 2, naphthalene is reacted with trichloromethanesulfenyl chloride, to obtain thiophosgene in good yield.

Example 7

By the procedure employed in Example 2, biphenyl is reacted with trichloromethanesulfenyl chloride, to obtain thiophosgene in good yield.

Example 8

This experiment was conducted in apparatus similar to that employed in Example 2, but of smaller size, and the procedure was also similar.

The reaction flask was charged with 100 cc. of xylene and 0.5 g. of aluminum chloride. This mixture was heated to 135° C. and trichloromethanesulfenyl chloride (46.5 g., 0.25 mole) was slowly added over a period of 20 minutes. The pot temperature was maintained between 135° C. and 142° C. throughout the experiment, which was discontinued 1 hour after addition of the organic chloride was commenced.

During the reaction, hydrogen chloride was evolved copiously and thiophosgene of excellent appearance was obtained overhead. The maximum column overhead temperature was 90° C. and the maximum pot temperature was 142° C. No attempt was made to obtain a maximum yield of product thiophosgene, but the yield was good and can be improved by carrying out the reaction for a longer time.

Example 9

This experiment paralleled Example 8, except that the reaction time was 1.5 hours, and 0.5 g. of zinc chloride was used as catalyst instead of aluminum chloride.

Example 10

The procedure described in Example 2 is carried out with the same reactants, but instead of the ferric chloride catalyst, a like quantity of stannic chloride is used. The reaction is essentially the same to obtain a good yield of thiophosgene.

The above particular description is, of course, by way of illustration, and many modifications of the invention will occur to persons skilled in the art. Accordingly, it is intended that the patent shall cover, by suitable expression in the claims, whatever features of patentable novelty reside in the invention.

I claim:

1. A process for the production of thiophosgene, which comprises mixing in the presence of a Friedel-Crafts catalyst trichloromethanesulfenyl chloride with an aromatic compound having ring-attached hydrogen substitutible by chlorine, and while maintaining the reaction mass between 75° C. and 250° C. recovering thiophosgene therefrom in the vapor phase.

2. The process of claim 1 in which said aromatic compound has the formula RQ in which Q represents an aromatic hydrocarbon, and in which R represents from 0 to 3 substituents on the ring of said aromatic hydrocarbon, said substituents falling in the group consisting of chlorine, alkyl radicals, and aryl radicals.

3. The process of claim 2 in which the reaction is carried out simultaneously with the distillation of thiophosgene and hydrogen chloride from the reaction mass.

4. The process of claim 3 in which thiophosgene is separated from hydrogen chloride by fractional condensation.

5. The process of claim 1 in which the catalyst is selected from the group consisting of ferric chloride, aluminum chloride, zinc chloride and stannic chloride.

6. The process of claim 5 in which the catalyst is ferric chloride.

7. The process of claim 5 in which the catalyst is aluminum chloride.

8. The process of claim 5 in which the catalyst is zinc chloride.

9. The process of claim 5 in which the catalyst is stannic chloride.

10. The process of claim 5 in which Q of RQ contains not more than 10 carbon atoms.

11. The process of claim 10 in which R represents from 1 to 3 alkyl radicals containing not more than 12 carbon atoms per radical.

12. The process of claim 11 in which the totality of carbon atoms of R does not exceed 12.

13. The process of claim 12 in which RQ represents xylene.

14. The process of claim 12 in which RQ represents toluene.

15. The process of claim 10 in which R represents from 1 to 3 chlorine atoms.

16. The process of claim 15 in which RQ represents chlorobenzene.

17. The process of claim 10 in which RQ represents biphenyl.

18. The process of claim 10 in which RQ represents naphthalene.

EDWARD F. ORWOLL.

OTHER REFERENCES

Sanno and Stefano: Chem. Zentra., 1943, I, page 827.

Thomas: "Anhydrous Aluminum Chloride in Organic Chemistry," Reinhold Pub. Co. (1941), pp. 165, 612, 696 and 697.

Vorlander et al.: Ber., 52, 418 (1919).